United States Patent [19]

Orth, Jr.

[11] 4,026,792
[45] May 31, 1977

[54] FILTER SYSTEM AND METHOD OF FILTERING ANIMAL PROCESSING WASTES

[75] Inventor: George Otto Orth, Jr., Seattle, Wash.

[73] Assignee: Herbert L. Kalbfleisch, Sooke, Canada

[22] Filed: Jan. 24, 1975

[21] Appl. No.: 543,682

[52] U.S. Cl. .................................. 210/27; 210/40; 210/73 W; 210/DIG. 26
[51] Int. Cl.² ........................................ B01D 15/00
[58] Field of Search ............... 210/27, 40, 41, 77, 210/78, 360 R, 380, 381, 446, 502, 503, 504, 505, 508, DIG. 21, 73 OW; 426/807

[56] References Cited

UNITED STATES PATENTS

| | | | |
|---|---|---|---|
| 1,230,099 | 6/1917 | Bingham | 210/380 |
| 2,065,658 | 12/1936 | Compton | 210/446 |
| 2,739,713 | 3/1956 | Robinson | 210/41 |
| 3,327,859 | 6/1967 | Pall | 210/502 |
| 3,494,863 | 2/1970 | Greenman | 210/41 |
| 3,689,406 | 9/1972 | Ohta | 210/40 |
| 3,697,419 | 10/1972 | Grant | 210/27 |
| 3,707,464 | 12/1972 | Burns et al. | 210/73 OW |
| 3,836,681 | 9/1974 | Dodd | 210/77 |

Primary Examiner—Thomas G. Wyse
Assistant Examiner—Ivars Cintins
Attorney, Agent, or Firm—Seed, Berry, Vernon & Baynham

[57] ABSTRACT

Alternate hydrophilic and hydrophobic fiber filters are used to remove particulate matter and oil from aqueous animal processing wastes, such as those from cannery operations, poultry processing plants and packing plants. The fiber used to make the filters is preferably a low-lignin content, cellulosic fiber that is digestible by ruminating animals. The adsorbed oil in the hydrophobic filter may be removed and the filter reused. The hydrophilic fiber filter containing particulate matter may be dewatered and converted to animal feed or fertilizer.

2 Claims, 2 Drawing Figures

FILTER SYSTEM AND METHOD OF FILTERING ANIMAL PROCESSING WASTES

BACKGROUND OF THE INVENTION

1. Field of the Invention

This invention relates to a filter system for removing oil substances and particulate matter from animal processing waste and to a method of removing such.

2. Prior Art Relating to the Disclosure

Processing water from fish canneries, packing plants, poultry plants and other animal processing plants generally contains particulate waste, as well as liquid and solid fats and/or oils. This processing waste water can no longer be dumped untreated into water bodies because of new and existing pollution regulations, or disposed of through municipal water treatment facilities without considerable pretreatment. The process and system described herein enable removal of particulate wastes and the liquid and solid fats and/or oily materials from the processing water at economical cost.

U.S. Pat. No. 2,367,415 describes a method of treating stick water so that it can be used as either a fertilizer or an animal food. U.S. Pat. Nos. 2,995,434 and 3,238,124 describe the production of a soil conditioner by passing a sewage effluent or industrial waste, such as from a cannery or meat packing plant, through a bed of chopped redwood bark. U.S. Pat. No. 2,717,835 describes a process of solubilizing stick water by the addition of urea to make a poultry feed supplement.

SUMMARY OF THE INVENTION

It is a primary object of this invention to provide a filter system and media for effective removal of liquid and solid fats, oils and particulate matter from aqueous waste streams.

Other objects of this invention are (1) to provide a filter system for removal of liquid and solid fats, oils and particulate matter from aqueous animal processing waste wherein the spent filters are used as an animal feed for ruminating animals; (2) to provide a combination of hydrophobichydrophilic fiber mats for removing oils, liquid and solid fats and particulate matter from aqueous animal processing wastes; (3) to provide a combination of form-retaining, cellulosic, hydrophobic and hydrophilic fiber mats ranging in density from 0.2 to 15 pounds per cubic foot for removal of oils, liquid and solid fats and particulate matter from aqueous animal processing wastes; and (4) to provide a filter apparatus including a vortex separator wherein the filter medium is placed so that the particulate matter, fats and oils in the aqueous waste flow to the vortex base and are drawn through the filters.

These and other objects of the invention are accomplished by providing a pair of filter elements through which waste water is directed. One filter element is of a hydrophobic nature, while the other filter element is of a hydrophilic nature. The hydrophobic filter removes oil, liquid and solid fats and oily particles from the waste water, and the hydrophilic filter subsequently removes the remaining particles from the water. Relatively pure water is recovered after passage through the filter.

The hydrophilic filter may be formed from a cellulosic fiber mat of low lignin content, thereby making the filter suitable as a feed for ruminating animals. The hydrophobic filter may also be formed from a cellulosic fiber mat, the fibers of which are treated with a material rendering them substantially non-wettable by water and oil adsorptive, or from other hydrophobic filter media, such as described in U.S. Pat. Nos. 2,367,384; 3,617,565; 3,617,566; 3,607,741; and 3,630,891.

DETAILED DESCRIPTION OF THE INVENTION

Figure 1:
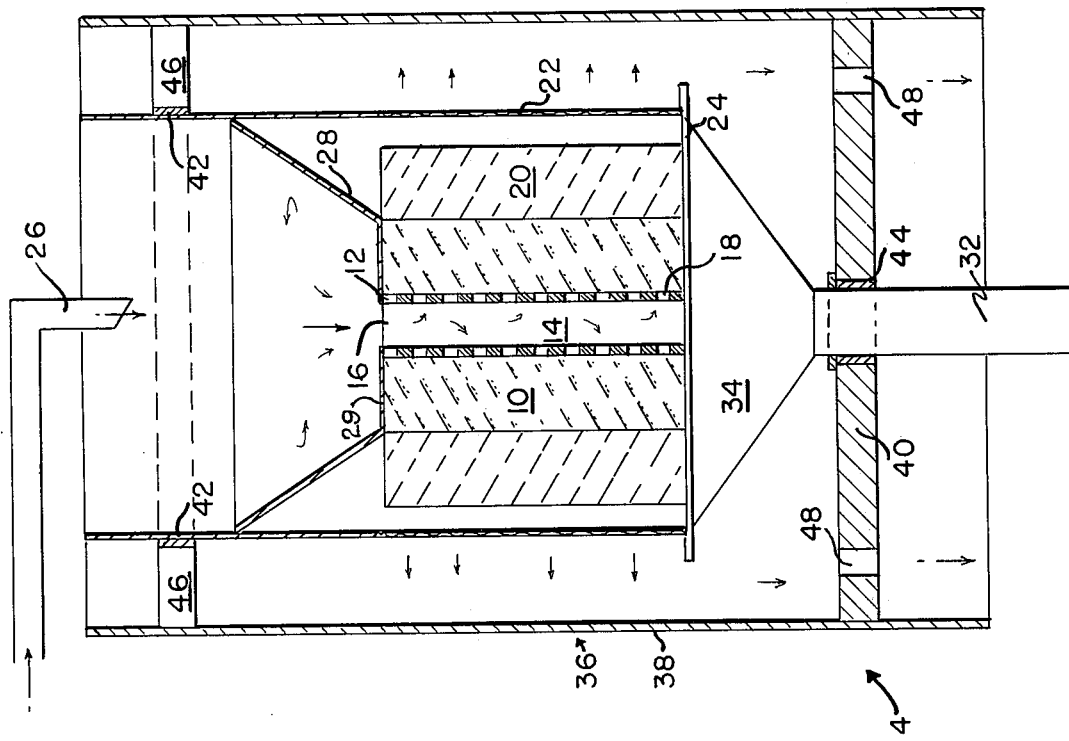
FIG. 1 is a side cross-sectional view of the preferred embodiment of the invention in which the waste water is drawn through the filter elements by centrifugal force.

The preferred embodiment of the filter unit 4 as shown in FIG. 1 includes a cylindrical layer of hydrophobic filter material 10 surrounding a perforated distribution tube 12. The distribution tube 12 forms a cylindrical distribution cavity 14 into which waste water flows through the open top end 16. Fluid communication between the distribution cavity 14 and the hydrophobic filter 10 is provided by a plurality of perforations 18 in the distribution tube 12. The construction of the distribution tube 12 is not critical, but it should be of a material that will withstand the corrosive effects of the waste water, such as stainless steel, and it should be of sufficient strength to withstand the radial stress placed on it. A cylindrical layer of hydrophilic filter material 20 surrounds the hydrophobic filter 10. The thickness and height of the filters 10, 20 will vary depending upon the characterisitics of the waste water as well as the desired frequency of filter change. For example, waste water having a relatively high concentration of oil will require a larger hydrophobic filter for a given size hydrophilic filter than will waste water having a lower concentration of oil. Similarly, filters having a greater thickness will require less frequent changing. Thus the specific structural details will, of necessity, vary depending upon the particular circumstances for each installation.

The filters 10, 20 are enclosed by a fluid-pervious basket 22 which allows water to flow radially from the hydrophilic filter 20. The distribution tube 12 and the filters 10, 20 rest on a bottom plate 24 which prevents water from escaping, except through the perforations in the basket 22.

Waste water enters the filter unit 4 through an inlet pipe 26. The end of the inlet pipe 26 directs the waste water downward along the axis of the distribution tube 12. The waste water is then guided into the distribution cavity 14 by a conical funnel 28 secured to the distribution tube 12 by spaced struts 29. The top edge of the funnel 28 is secured to the basket 22 to insure that the waste water entering the filter unit 4 passes into the distribution cavity 14 and through the filters 10, 20.

A drive shaft 32 is secured to the bottom plate 24 by transition piece 34 which couples the wide diameter bottom plate 24 to the narrow diameter drive shaft 32. A suitable source of rotational energy is provided (not shown) for rotating the drive shaft 32.

The basket 22 is surrounded on all sides by an enclosure 36 having sidewalls 38 supported on a suitable base and a bottom wall 40. The shaft 32 extends through wall 40 in suitable bearings 44. Upper bearings 42 are secured to the inner sidewalls 38 through bearing supports 46. The bearings 42, 44 prevent axial movement of the basket 22 and drive shaft 32.

The enclosure bottom 40 contains a plurality of through openings 48 which allow the relatively pure water to exit the enclosure 36 for collection below.

In operation, waste water containing oils, liquid and solid fats and particulate matter flows into the filter unit 4 through the inlet pipe 26. The waste water flows axially downward and is guided into the distribution cavity 14 by the funnel 28. A suitable power source (not shown) continuously rotates the basket 22 through the drive shaft 32. As the water enters the distribution cavity 14, it undergoes rotational acceleration, thereby producing a vortex. The speed of rotation is adjusted so that the particulates and oils concentrate in the center of the vortex. The waste water, by centrifugal force, is directed through the perforations 18 in the distribution tube 12 and into the hydrophobic filter 10. Fats, oil and oily particulate matter are adsorbed by the hydrophobic filter 10. The remaining waste water then moves radially into the hydrophilic filter 20 which removes the remaining particulate matter. Relatively pure water then passes through the perforations in the basket 22 into the area enclosed by the enclosure 36 and exits therefrom through openings 48 in the enclosure bottom 40.

When the filters 10, 20 become saturated and lose their effectiveness, they are removed and replaced.

The fiber used to make the hydrophilic filter is preferably a low-lignin, cellulosic fiber which is easily digestible by ruminating animals. The hydrophilic filter 20 containing particulate matter may be dewatered and converted to animal feed or fertilizer, as may be desired.

The fiber used to fabricate the hydrophobic fiber may also be a low-lignin content, cellulosic fiber treated to render the fibers hydrophobic with materials which are nontoxic and palatable to ruminating animals. The absorbed oil and fats absorbed by the hydrophobic filter 10 may be removed and the filter reused. Alternatively, the hydrophobic filter 10 may be used in preparation of an animal feed or fertilizer after the adsorbed oil and fats have been removed therefrom.

Figure 2:
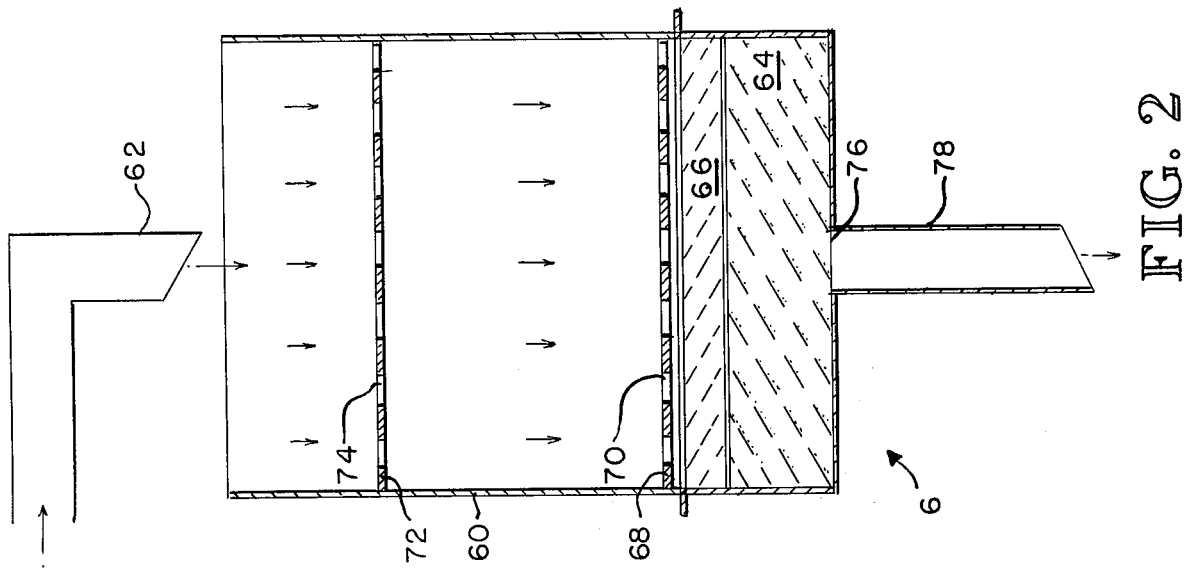
FIG. 2 is a side cross-sectional view of an alternative embodiment of the invention in which the waste water is drawn through the filters by gravity.

An alternative embodiment of the invention is shown in FIG. 2. Waste water flows into a tank 60 through an inlet pipe 62. A fiber mat of hydrophobic filter material 64, having a shape corresponding to the cross-sectional dimension of the tank 60, is placed at the bottom of the tank 60, and a fiber mat of hydrophilic filter material 66 is placed on top of the hydrophobic filter 64. The filters 64, 66 are securely held in place at the bottom of the tank by a perforated retainer plate 68. The retainer plate 68 contains a plurality of perforations 70 which allow waste water to pass therethrough into and through the filters 64, 66. A similarly perforated disbursement plate 72, having perforations 74, is axially spaced above the retainer plate 68. The disbursement plate 72 disburses the liquid entering the tank at its center to provide a more uniform cross-sectional flow through the tank 60. Relatively pure water exits the hydrophobic filter 64 through an outlet port 76 and is carried away by outlet pipe 78.

In operation, waste water containing oils, fats and particulate matter flows into the tank 60 through the inlet pipe 62. The flow of water, which is concentrated at the center of the tank 60, is disbursed by disbursement plate 72, thereby causing an equal flow of water through each of the perforations 74 in the disbursement plate 72. The water then flows through the perforations 70 in the retainer plate 68 and into the hydrophilic filter 66 where the particulate matter is removed. Subsequently, the waste water is drawn through the hydrophobic filter 64 by gravity and the oils and fats are removed from the waste water to allow relatively pure water to flow through the outlet port 76 and into the outlet pipe 78.

The embodiments of the invention in which a particular property or privilege is claimed are defined as follows:

1. A method of treating waste water containing particulate matter, liquid oils and fats to remove the same, comprising:

passing the waste water stream through a hydrophilic fiber filter composed of a form-retaining cellulosic fiber mat having a density ranging from 0.2 to 15 lb. per cu. ft. for removal of the particulate matter contained in the aqueous waste water streams, and immediately passing the water emerging from the hydrophilic fiber filter through a hydrophobic fiber filter composed of a form-retaining cellulosic fiber mat having a density ranging from 0.2 to 15 lb. per cu. ft. whose fibers are treated with a material rendering them oil adsorbent and substantially nonwettable by water, the hydrophobic fiber filter adsorbing the liquid oils and fats from the water stream passing therethrough.

2. The method of claim 1 wherein the cellulosic fiber making up the hydrophilic filter is nontoxic and palatable to ruminating animals and is convertible into animal feed for ruminating animals.

\* \* \* \* \*